United States Patent
Prytz et al.

(10) Patent No.: US 8,396,480 B2
(45) Date of Patent: Mar. 12, 2013

(54) LOAD SHARING IN MULTI-ACCESS SYSTEMS

(75) Inventors: Mikael Prytz, Rönning (SE); Anders Furuskär, Stockholm (SE); Jonas Pettersson, Luleå (SE); Arne Simonsson, Gammelstad (SE); Harald Kallin, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1143 days.

(21) Appl. No.: 11/794,149

(22) PCT Filed: Jan. 13, 2005

(86) PCT No.: PCT/SE2005/000029
§ 371 (c)(1),
(2), (4) Date: Jun. 26, 2007

(87) PCT Pub. No.: WO2006/075937
PCT Pub. Date: Jul. 20, 2006

(65) Prior Publication Data
US 2007/0297399 A1 Dec. 27, 2007

(51) Int. Cl.
*H04W 36/00* (2009.01)
(52) U.S. Cl. .............. 455/444; 455/453; 455/456.1; 455/456.4; 370/384; 709/226; 709/231; 715/719; 715/757
(58) Field of Classification Search ............ 455/444, 455/453, 456.4, 461, 456.1; 370/384; 705/14, 705/26; 709/226, 231; 715/719, 757
See application file for complete search history.

(56) References Cited

U.S. PATENT DOCUMENTS

| | | | |
|---|---|---|---|
| 5,796,722 A | 8/1998 | Kotzin et al. | |
| 6,163,694 A | 12/2000 | Lind et al. | |
| 6,208,863 B1 * | 3/2001 | Salonaho | 455/444 |
| 6,356,762 B1 * | 3/2002 | Guenther | 455/456.4 |
| 7,197,318 B2 * | 3/2007 | Schwarz et al. | 455/453 |
| 7,324,478 B2 | 1/2008 | Park et al. | |

(Continued)

FOREIGN PATENT DOCUMENTS

| | | |
|---|---|---|
| EP | 1389888 | 2/2004 |
| JP | 6-105363 A | 4/1994 |

(Continued)

OTHER PUBLICATIONS

International Search Report mailed Sep. 21, 2005.

(Continued)

*Primary Examiner* — William D Cumming
(74) *Attorney, Agent, or Firm* — Nixon & Vanderhye, P.C.

(57) ABSTRACT

In a multi-access system, an access selection principle is achieved by selecting a signal strength threshold level based on a determined load level ($U_{LOCAL}$) in a first access network. A new user in an area commonly covered by more than one access network attempts to allocate to the first access network if an experienced signal strength exceeds the signal strength threshold level. Communication utility can preferably be maximised or at least be taken into account by using suitable load level dependencies. By increasing the threshold when the load level approaches the capacity limit, a completely filled first access network is avoided. This gives an opportunity to let particularly well-suited users still have access to the first access network. At the same time, since the preferred access is decided before the actual access attempt, control signalling can be significantly reduced, even at very high traffic loads.

10 Claims, 10 Drawing Sheets

U.S. PATENT DOCUMENTS

| | | | |
|---|---|---|---|
| 7,487,112 B2 * | 2/2009 | Barnes, Jr. | 705/26.8 |
| 2002/0137518 A1 | 9/2002 | Achour | |
| 2002/0165962 A1 * | 11/2002 | Alvarez et al. | 709/226 |
| 2003/0065805 A1 * | 4/2003 | Barnes, Jr. | 709/231 |
| 2003/0220835 A1 * | 11/2003 | Barnes, Jr. | 705/14 |
| 2005/0136949 A1 * | 6/2005 | Barnes, Jr. | 455/461 |
| 2007/0118426 A1 * | 5/2007 | Barnes, Jr. | 705/14 |
| 2007/0173266 A1 * | 7/2007 | Barnes, Jr. | 455/456.1 |
| 2007/0297399 A1 * | 12/2007 | Prytz et al. | 370/384 |
| 2009/0144624 A1 * | 6/2009 | Barnes, Jr. | 715/719 |
| 2009/0254843 A1 * | 10/2009 | Van Wie et al. | 715/757 |

FOREIGN PATENT DOCUMENTS

| | | |
|---|---|---|
| JP | 2004-96707 A | 3/2004 |
| JP | 2004-349976 A | 12/2004 |

OTHER PUBLICATIONS

Pahlavan et al, "Handoff in Hybrid Mobile Data Networks", IEEE Personal Communications, Apr. 2000, pp. 34.

Kallijokulju, P. Meche, M. J. Rinne, J. Vallstrom, P. Varshney and S-G. Haggman, "Radio Access Selection for Multistandard Terminals", in IEEE Communications Magazine, pp. 116-124, Oct. 2001.

Furuskär, "Radio Resource Sharing and Bearer Service Allocation for Multi-Bearer Service, Multi-Access Wireless Networks—Methods to Improve Capacity", Radio Communication Systems Laboratory, A dissertation submitted to the Royal Institute of Technology in partial fulfillment of the requirements for the degree of Doctor of Philosophy, May 2003.

* cited by examiner

LOAD SHARING IN MULTI-ACCESS SYSTEMS

This application is the U.S. national phase of International Application No. PCT/SE2005/000029 filed 13 Jan. 2005, the entire contents of which are hereby incorporated herein by reference.

TECHNICAL FIELD

The present invention is in general related to multi-access wireless communications systems and in particular to load-sharing devices and methods in such systems.

BACKGROUND

Future wireless networks most probably will comprise a large portion of multi-access networks. A typical example is a network composed of a wide area coverage system providing moderate bitrate services to mobile users, complemented by a local area coverage system providing high bitrate services to users in hotspots. In such a system, both the user behaviour and the system characteristics call for better user quality, e.g. higher bitrates, which is being offered in the hotspots.

A combined system with heterogeneous, location-dependent, quality requirements thus appears. The overall capacity C can then be defined as the largest number of users U for which both the wide area ($Q_{wide\_min}$) and local area ($Q_{local\_min}$) quality requirements are fulfilled:

$$C = \max\{U : Q_{wide}(U_{wide}) >= Q_{wide\_min} \,\&\, Q_{local}(U_{local}) >= Q_{local\_min}\}$$

A general goal is to keep the users satisfied. Satisfaction of the user or experienced communication utility can therefore serve as an optimisation parameter. As the potential experienced communication utility generated by the system depends on the overall capacity, the question emerges of how to maximise this overall capacity.

However, there is generally no linear relationship between the experienced utility for the user and maximisation of the overall capacity. Instead, almost any relation between user experienced utility and capacity may exist. Taking this into account, the utility maximisation problem may be reformulated as:

$$\max \sum_{i=1}^{m} R_{wide,i} + \sum_{j=1}^{n} R_{local,j} : Q_{wide,i} > Q_{wide\_min}, Q_{local,j} > Q_{local\_min}$$

where $R_{wide,i}$, $R_{local,j}$ are the experienced utility for each user i, j in wide area and local area, respectively.

Also for the operators, experienced utility is of interest. WCDMA-GSM is an existing multi-service multi-access system. There can be different pricing policies and revenues for different services; e.g. voice, video-telephony and best effort data. The higher the experienced utility is, the higher price the users are prepared to pay. The service price and revenue may also differ between users as well. Different service sets and service quality may be offered on the different accesses, e.g. video telephony is offered only on WCDMA and a lower maximum best-effort packet data rate is offered on GSM.

One possible access selection principle is that there is a preferred access for each mobile. The preferred access is selected if there is coverage and capacity, which means that the service can be offered. If there is no capacity to offer the service, admission is rejected and an attempt to establish the service on the other access is initiated. This is referred to as directed retry. Service-based access selection has also been proposed for WCDMA-GSM [3]. In this case, the user is allocated to the access technology where its currently requested service is expected to be most efficiently supported. An example is to allocate voice calls to GSM and data sessions to WCDMA. It has also been proposed to measure the actual radio resource consumption of users, e.g. in terms of required power level, and allocate users based on this.

Combinations of cellular systems like GSM and WCDMA and systems of WLAN-type, e.g. IEEE 802.11, are other examples of multi-access systems.

For such systems access selection based on estimated signal strength has been proposed, see e.g. [1-2].

In U.S. Pat. No. 6,163,694, here denoted as reference [4], a method for cell selection in a hierarchic cellular telephone system is disclosed. A cell selection in a lowest possible hierarchic level is desired, where a downlink signal strength exceeds a certain threshold. Within a hierarchic level, the cell with the highest measured downlink signal strength is selected.

If one of the access networks generally provides better conditions, typically the local area coverage system, one approach is to allocate as many users as possible to the local area system until it reaches its capacity limit. Then users are allocated to the wide area system. This can easily be realised by letting users first try to access the local area system, and if this fails redirect their access attempts to the wide area system. This is a directed retry approach having a fixed preferred access for all users.

A problem with this approach is that the system relatively frequently reaches a situation, where all access attempts have to go through the directed retry mechanism. Such mechanisms involve large control signalling efforts and become a non-negligible load on the communications system.

SUMMARY

General problems with prior art solutions are that little attention is paid to the actual experienced user utility or that access mechanisms are used that involve large control signalling efforts.

An object of the technology disclosed herein is thus to provide methods and devices enabling access to multi-access systems that takes user experienced communication utility into account without relying on control signalling intense mechanisms.

The above object by the technology disclosed herein, wherein, in general, an access selection principle is achieved by selecting a signal strength threshold level based on a determined load level in a first access network. A new user in an area commonly covered by more than one access network attempts to allocate to the first access network if an experienced signal strength exceeds the signal strength threshold level. Communication utility can preferably be maximised or at least be taken into account by using suitable load level dependencies. By increasing the threshold when the load level approaches the capacity limit, a completely filled first access network is avoided. This gives an opportunity to let particularly well-suited users still have access to the first access network. At the same time, since the preferred access is decided before the actual access attempt, control signalling can be significantly reduced, even at very high traffic loads.

One advantage with the technology disclosed herein is that higher capacity yields and higher potential communication utility is possible to achieve with a relatively simple access mechanism.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the present description, the following abbreviations are generally used:

| | |
|---|---|
| GSM | Global System for Mobile Communication |
| WLAN | Wireless Local Area Network |
| WCDMA | Wideband Code Division Multiple Access |
| UMTS | Universal Mobile Telephony System |
| CSE | Circuit Switched Equivalent |
| U | The number of users |
| C | Capacity |
| SNR | Signal-to-Noise Ratio |
| Q | Quality |

Some observations are first made:

The offered service quality decreases generally with the number of served users. This holds both in the wide area and local area systems. The traffic load at which quality equals the quality requirement is denoted the "capacity".

The overall capacity is maximised when the quality requirements are simultaneously met in both the wide area and local area systems. If this is not the case, "spare capacity" is available in at least one of the systems. At traffic loads below the overall capacity limit, several access solutions $\{U_{wide}, U_{local}\}$ exist that fulfil the quality requirements $Q_{wide}(U_{wide}) >= Q_{wide\_min}$ and $Q_{local}(U_{local}) >= Q_{local\_min}$.

Based on these observations, it is first noticed that capacity is maximised through controlling the number or fraction of users in the wide area and local area systems so that the wide area and local area quality requirements are simultaneously met. This also maximises the potential total communication utility at full load, which possibly also coincides with maximised revenue for the system operator. It is further noticed that at traffic loads below the absolute capacity limit, user allocations $\{U_{wide}, U_{local}\}$ that result in large experienced communication utility preferably are selected.

Figure 1:
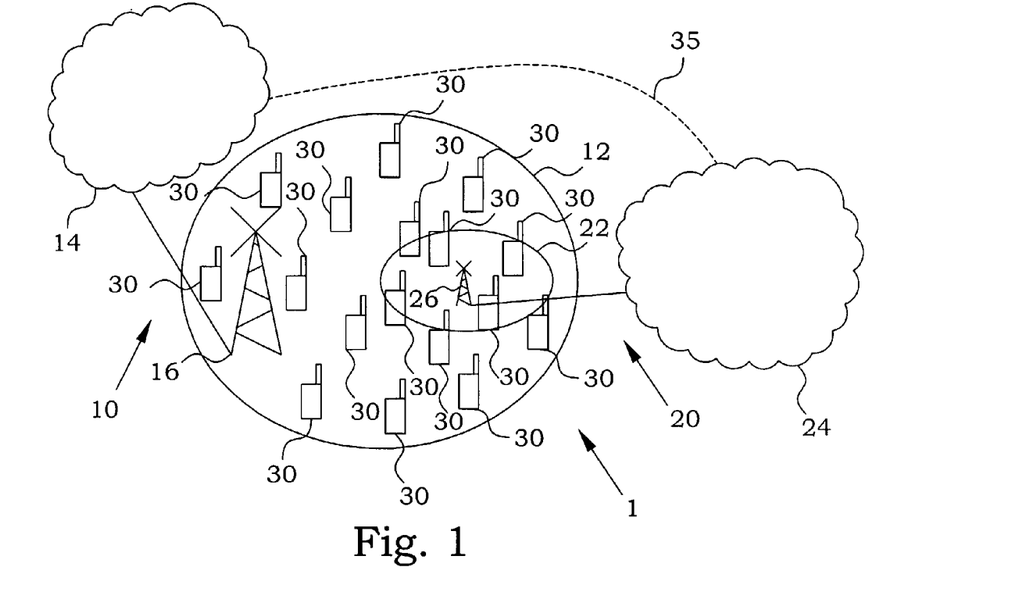
FIG. 1 is a block scheme of a multi-access wireless communications system.

FIG. 1 depicts a multi-access network 1 with a wide area access network 10 and a local area access network 20, also denoted subsystems. A base station 16 of the wide area access network 10 is capable of communicating with mobile stations 30 within a wide area cell 12. The base station 16 is further connected to a main wide area network 14. A base station 26 of the local area access network 20 is capable of communicating with mobile stations 30 within a local area cell 22. The wide area cell 12 and the local area cell 22 overlap, having a common area. In this particular embodiment, the entire local area cell 22 is also covered by the wide area cell 12. The base station 26 is further connected to a main local area network 24. Typically, there is also a connection 35 between the access networks 14, 24, and in some systems, the access networks 14, 24 may even be fully or partly integrated.

From FIG. 1, it can be understood that the local area access network 20 is able to connect a fraction of the total mobile terminals 30 that are present in the system. This fraction depends on the relative size of the cells and the actual distribution of mobile terminals 30. Because of the dependence on the mobile terminal distribution, the fraction may vary from time to time.

Figure 2:
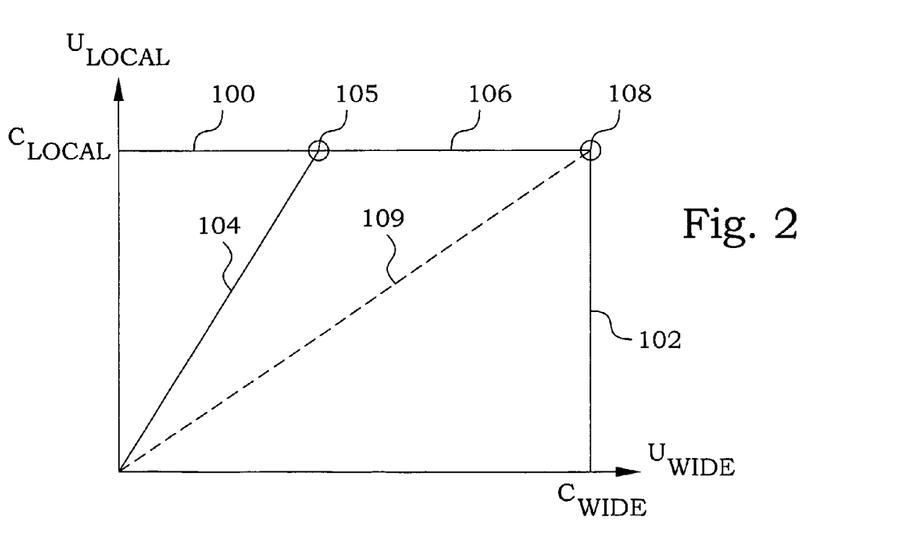
FIG. 2 is a diagram illustrating an occupancy plane, spanned by the number of users of a wide and local area access network, respectively, of a multi-access wireless communications system.

First, the effect of a prior art system using directed retries is illustrated by FIG. 2. On the horizontal axis, the number of users allocated to the wide area access network is noted, and on the vertical axis, the number of users allocated to the local area access network is noted. A wide area network capacity is denoted by $C_{wide}$ and the line 102, while a local area network is denoted by $C_{local}$ and the line 100. In this approach, all users that are within connectable distance from the local area base station are first trying to allocate to the local area network. The local area network is assumed to guarantee a higher quality of the communication. Users outside the local area network have no choice and have to allocate to the wide area network. When starting from a system without connected mobile terminals, assuming that the mobile terminal distribution over the system is essentially constant, the system is described by the situation in the lower left corner of the diagram of FIG. 2. When starting to connect mobile terminals, the system situation moves along the line 104. The slope of this line is determined by the fraction of mobile terminals that are within the local area cell, and is in this example assumed to be essentially static. The local area network is thus used for access when it is possible.

When the number of users becomes so high that the capacity of the local area network is occupied, the point 105 is reached. Here, no capacity is left in the local area network. However, the wide area network has still free capacity. When trying to make additional accesses attempts to the local area network, the directed retry mechanism will eventually let the mobile terminal allocate to the wide area network instead. Such situations are illustrated by the line 106, at the right hand side of point 105. During this entire line, frequent directed retries are made, which load the system with large amounts of control signalling. Finally, when the entire capacity of the multi-access system is reached, the point 108 is reached.

Clearly, the maximum combined capacity, and potential maximum total experienced communication utility, is reached in the point where $U_{wide}=C_{wide}$ and $U_{local}=C_{local}$ simultaneously, i.e. at point 108. This point can also be reached with other first allocation selection principles. For instance, if the allocation selection should be done so that $U_{wide}/C_{wide}=U_{local}/C_{local}$, i.e. following the dashed line 109, the point 108 will eventually be reached. Such selection has the advantage that no or very few directed retries have to be performed. However, instead, the total experienced communication utility becomes lower than in the previous case. A selection along the line 109 could be achieved e.g. by selecting an appropriate signal strength threshold, above which access attempts to the local area network is allowed.

Figure 3:
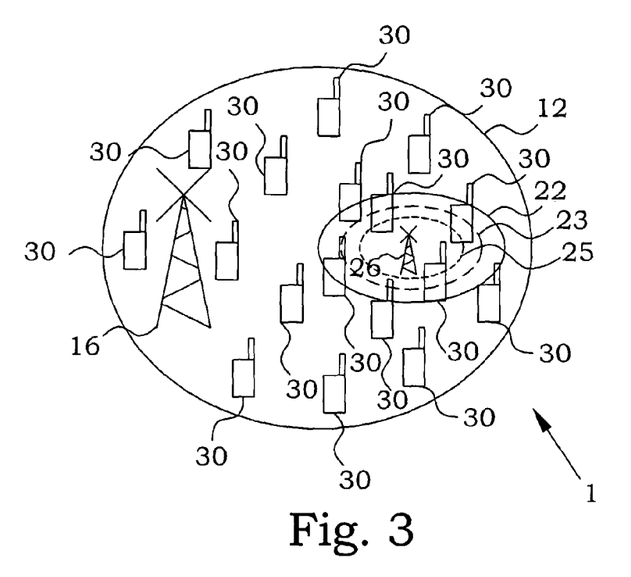
FIG. 3 is a block scheme of a multi-access wireless communications system according to an example embodiment of the technology disclosed herein.

The effect of such signal strength threshold is illustrated in FIG. 3. The entire local area cell is encircled by the solid line 22. By requesting that not only a signal strength sufficient for guaranteeing the required communication, but also a signal strength stronger than a certain threshold, a smaller apparent cell size will be the result, illustrated by the dashed lines 23 and 25. Since the cell size is reduced, the fraction of mobile terminals 30 being present within these reduced cells will also be lower. A lower fraction results in a less steep slope of the line 104 in FIG. 2. By having knowledge about the statistical distribution of mobile terminals within the system area, a threshold can be selected, that would result in the path illustrated by the dashed line 109.

Figure 4:
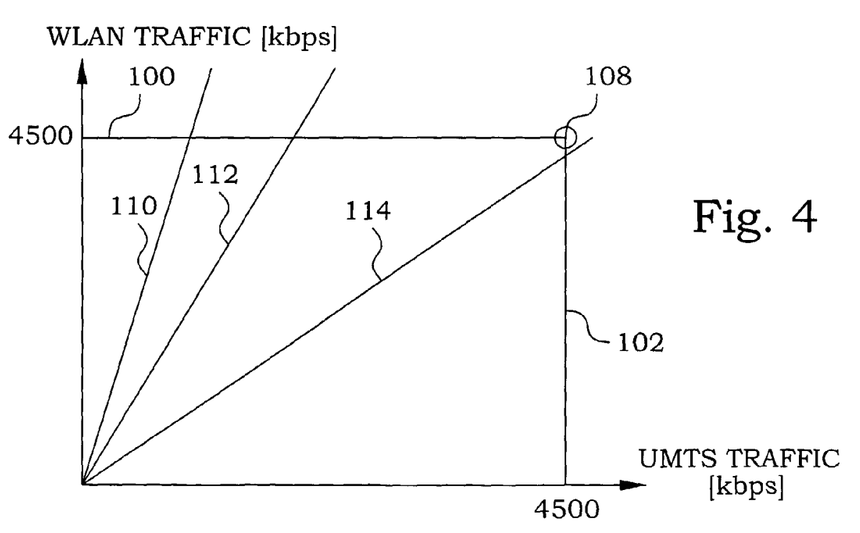
FIG. 4 is a diagram illustrating paths in an occupancy plane.

This behaviour has been verified in a simulation of a combined UMTS and WLAN multi-access system. In FIG. 4, traffic loads allocated to the different subsystems for different thresholds are illustrated. The subsystem capacities are also depicted. The system employs a form of signal strength-based access selection where the WLAN subsystem is selected whenever Signal-to-Noise Ratio (SNR) to the best WLAN access point exceeds a certain threshold $SNR_{min}$. The threshold that is closest to the ideal $U_{wide}/C_{wide}=U_{local}/C_{local}$ in this case is $SNR_{min}=20$ dB, corresponding to curve 114. Using this threshold, a total traffic of 4500+4500=9000 kbps is supported before reaching any capacity limit. Using $SNR_{min}=0$ dB, curve 110, supports only 1000+4500=5500 kbps before the WLAN capacity limit is reached and directed retries have to be performed. Curve 112 corresponds to $SNR_{min}=10$ dB.

Such a static access selection principle may be suitable for simple systems, and in cases where the knowledge about experienced utility is low. One minor drawback is, however, that below the maximum point 108, the system is not fully used to maximise the experienced communication utility.

When using a fixed predetermined signal strength threshold for achieving e.g. the line 109 (FIG. 2), the selection of the threshold has to be based on statistical behaviour of the mobile terminal distribution. However, as noticed further above, the situation is not always static, and the actual distribution may therefore be different from the statistical average, which results in that a line with a differing slope in a diagram such as in FIG. 2, is created. According to the technology disclosed herein, a signal strength threshold is used for determining which access network to connect to. In order to be able to compensate for variations in mobile terminal distribution, for taking the total experienced utility into account and/or avoiding extensive control signalling, the signal strength threshold is selected based on at least a load level of the local area network. The local area network load level has thereby to be determined and is then used for providing a signal strength threshold for allocation into the local area network.

By using such a dynamic signal strength threshold, dependent on at least the load level of one of the access networks, the allocation strategy can be adapted to many desirable conditions.

Figure 5:
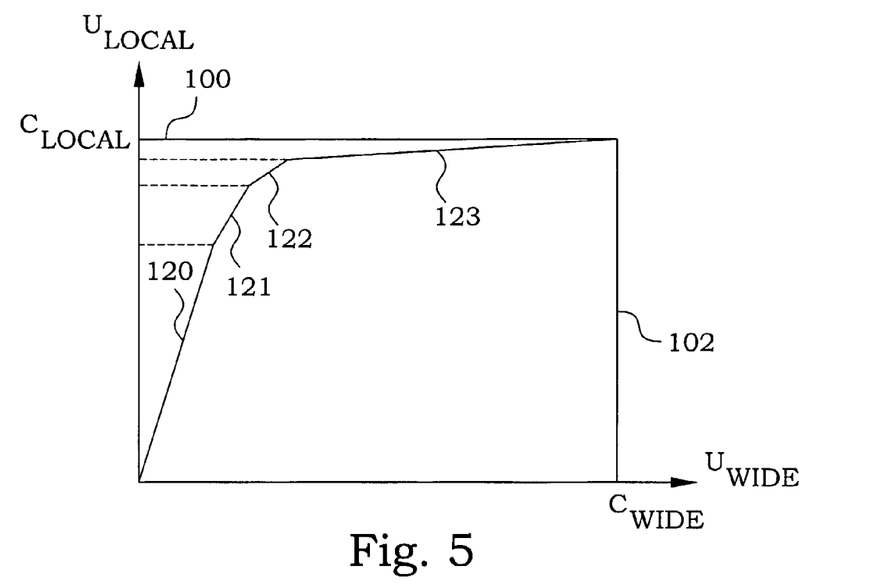
FIG. 5 is a diagram illustrating paths in an occupancy plane according to example embodiments of the technology disclosed herein.

FIG. 5 illustrates one strategy according to the technology disclosed herein that is both efficient and easy to implement. When the total load is low, it is beneficial to allow as many users as possible to be connected to the local area access network. A low signal strength threshold is thus used, resulting in a fraction of users connected to the local area network that is determined by the actual mobile terminal distribution, as shown by the first linear section 120. When the load level in the local area access network comes closer to the maximum capacity, a change in strategy has to be performed in order to avoid using retry mechanisms. The signal strength threshold may then be increased, only letting the closest mobile terminals be allocated to the local area network. The allocation strategy can be illustrated by a second linear section 121, having a different slope. Further closer to the capacity limit of the local area access network, the signal strength threshold for allowing first access attempt to the local area network is further increased, giving a third linear section 122. In the last linear section 123, very few new users are allowed to try to access the local area access network.

Figure 6:
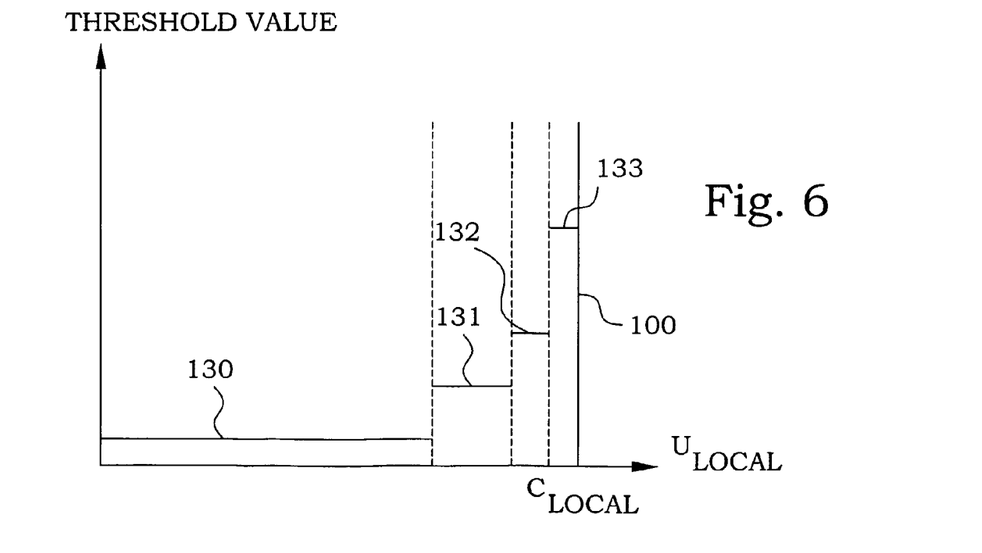
FIG. 6 is a diagram illustrating a relation between load level and signal strength threshold value according to an example embodiment of the technology disclosed herein.

The behaviour of the dynamic signal strength threshold can also be illustrated by the diagram in FIG. 6. Here, the signal strength threshold is plotted against local area network load level. The signal strength threshold is piecewise constant, exhibiting sections 130-133. The sections 130-133 correspond to the sections 120-123 in FIG. 5.

Figure 7:
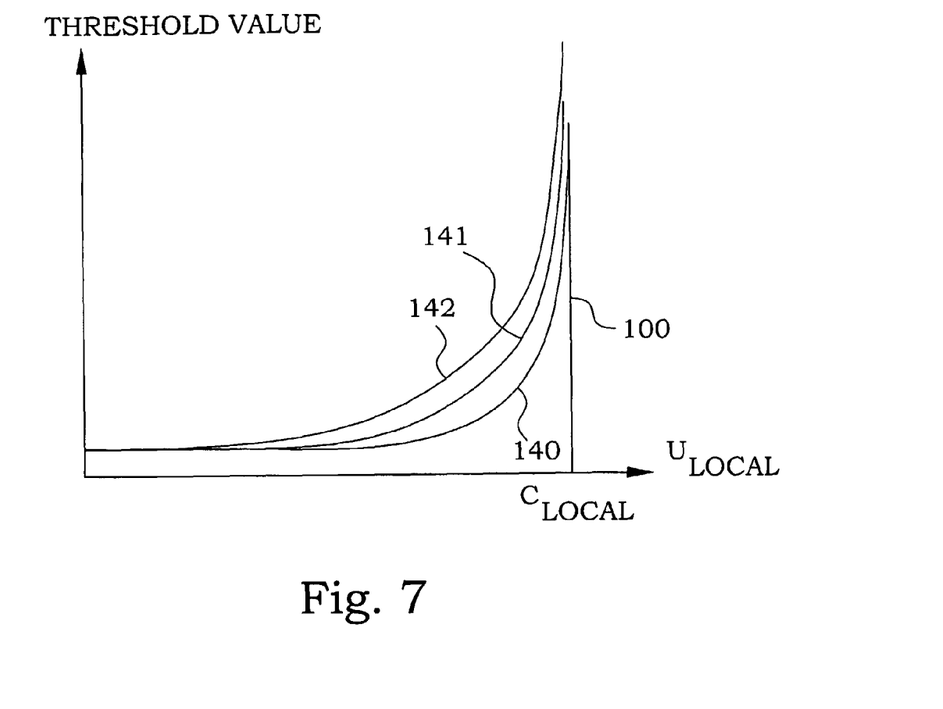
FIG. 7 is a diagram illustrating relations between load level and signal strength threshold value according to other example embodiments of the technology disclosed herein.

As anyone skilled in the art realises, the relation between load level and signal strength threshold can be of other types as well. A continuously increasing signal strength threshold with increasing load level, as shown by curves 140-142 in FIG. 7, may give about the same main behaviour as in FIG. 5. A steeper curve close to the maximum capacity gives in general an access distribution closer to what is shown in FIG. 2 by line 109.

Figure 8:
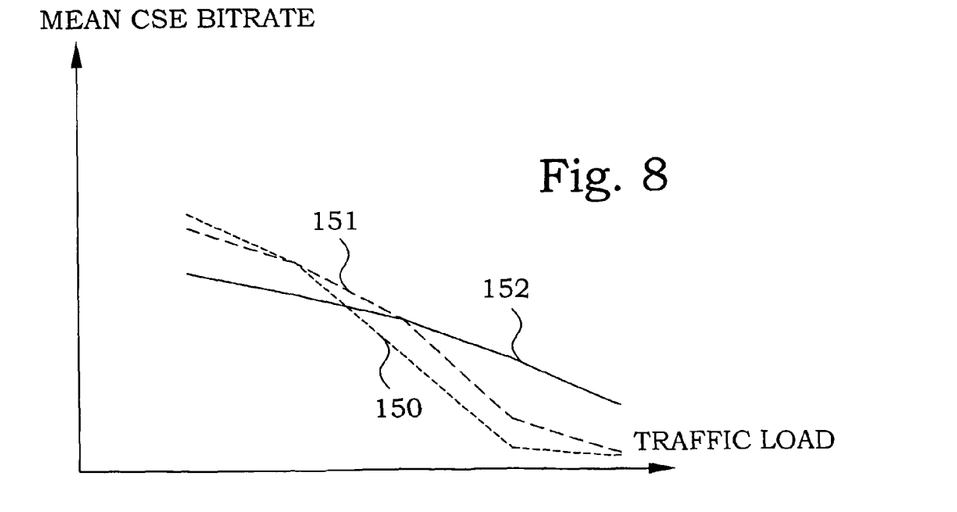
FIG. 8 is a diagram illustrating performance as a function of traffic load for a number of signal strength threshold values.

In FIG. 8, bitrate statistics as a function of total traffic load for the different thresholds are plotted for a model system. As expected from the previous discussions, it is seen that $SNR_{min}=20$ dB, curve 152, yields the highest mean bitrates for high traffic loads. For low traffic loads however, $SNR_{min}=0$ dB, curve 150, or $SNR_{min}=10$ dB, curve 151, yield higher mean bitrates. This indicates the potential benefits achievable with a dynamic access selection principle. Such an algorithm could be realised using $SNR_{min}=0$ dB for low loads, and then gradually increasing the threshold towards $SNR_{min}=20$ dB as the traffic load increases. Assuming that the utility generated per user grows with the bitrate, such an algorithm would also improve the experienced utility.

The strategies of constant fraction allocation, as described above, can also be realised using the dynamic signal strength threshold mechanism, even for systems where there is no prior knowledge of the statistical distribution of mobile terminals or where the distribution varies considerably with time. By not only monitoring the local area load level, but also the wide area load level, the signal strength threshold can be adapted in order to always let a certain fraction of new users be allocated to each network. If too many users are allocated the local area access network, the signal strength threshold is increased, and if too many users are allocated to the wide area network, the signal strength threshold is reduced.

Figure 9:
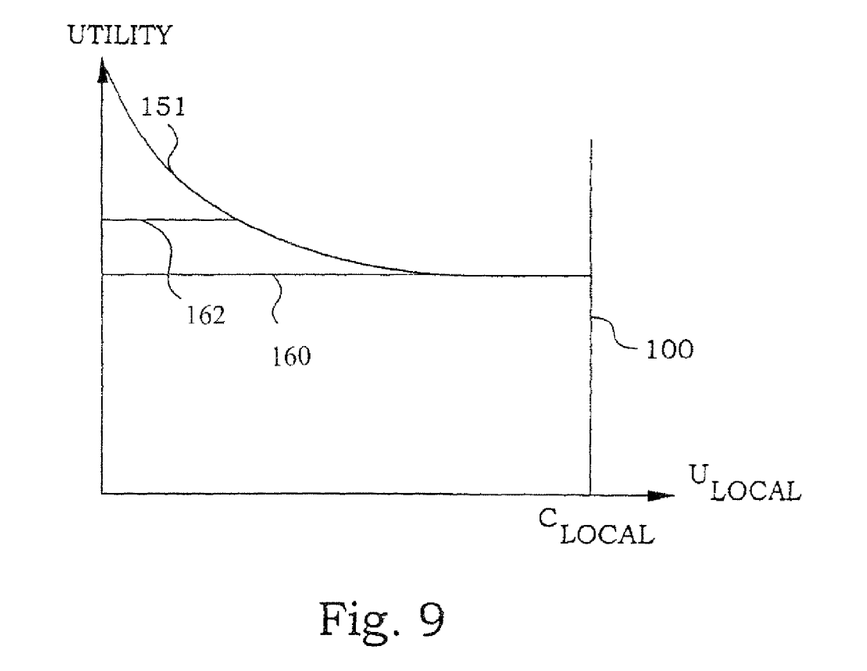
FIG. 9 is a diagram illustrating a relation between load level and utility.

In the embodiments above, it is assumed that the communications utility for a user is constant within each access network, but higher in the local area access network than in the wide area access network. However, in reality, the experienced utility may vary with load level. When trying to increase or even maximise the total utility of the communications system, the allocation strategies may be developed further. FIG. 9 illustrates a diagram showing different relations 160-162 between experienced communications utility and load level of the local area network. The relation 160 illustrates the constant utility as used in previous examples. This can e.g. be interpreted that the utility solely is dependent on the guaranteed performance, additional bitrate that is available at lower load does not increase the experienced communication utility. Relation 161 illustrates a utility that is strongly dependent on the available bit rate, in turn inverse proportional to the load level. In such an example, additional bitrate always increases the experienced communication utility. Relation 162 is an intermediate situation, where some additional performance is appreciated, but not over a certain maximum level.

Anyone skilled in the art realises that the above functions are just examples of possible relations. In an example embodiment, utilities of communication services are estimated based on a load level of respective access networks. Other non-exhaustive examples of utility function are described here below:

(1-load) implies that the experienced communication utility is proportional to the available bandwidth.

log 2(1-load) implies that the experienced communication utility is proportional to a bitrate doubling.

step function implies that the experienced communication utility is only improved when bitrate exceeds certain levels.

1/[constant+1/(1-load)] implies that at lower load, other limitations, such as fixed network delay, have strong impact on the experienced communication utility.

Figure 14:
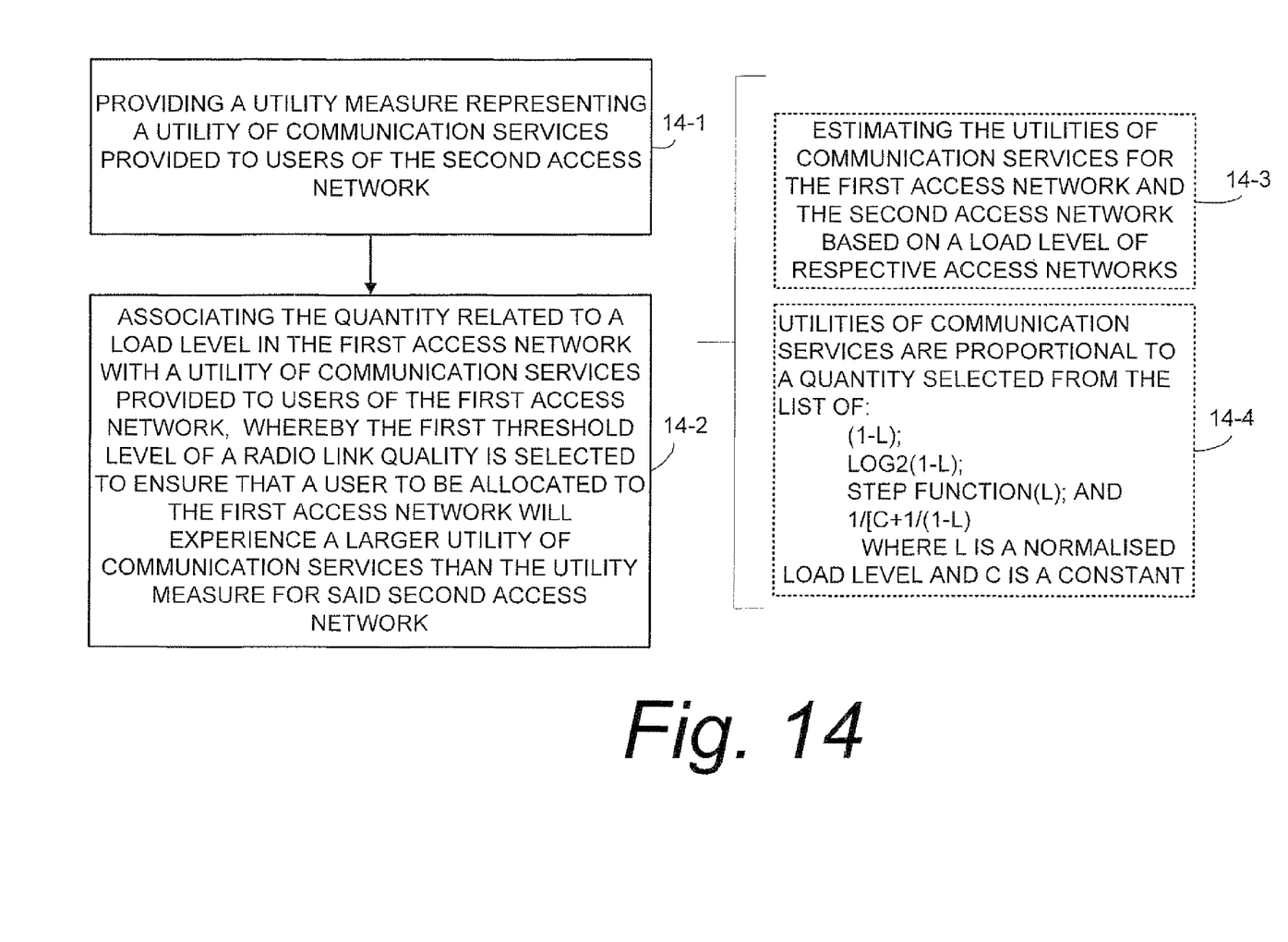
FIG. 14 is a flow diagram of the acts of a method according to another example embodiment which comprises providing a utility measure representing a utility of communication services provided to users of a second access network and associating the quantity related to a load level in the first access network with a utility of communication services provided to users of the first access network.

A similar relation may be found also for the wide area network. In a particular embodiment, a preferred access strategy is to adjust the signal strength threshold in such a way that allocation to the network presently giving the highest experienced utility is favoured. By knowing the utility-to-load relations in the different networks, a preferred path in the space spanned by the load levels for the local area and wide area networks, respectively, can be defined. Such a path will, furthermore, be different for different models of utility to load level relation. Typically, such optimum path will be located somewhere between the paths 104 and 109 of FIG. 2, and is striving to ensure that a user is allocated to the local area network only if he will experience a larger utility of communication services than in the wide area network. The path can then be obtained by adjusting the signal strength threshold in such a manner that the slope at each instant corresponds to the desired path. At least some of the foregoing is illustrated by the acts of FIG. 14. Act 14-1 comprises providing a utility measure representing a utility of communication services provided to users of the second access network. Act 14-2 comprises associating the quantity related to a load level in the first access network with a utility of communication services provided to users of the first access network, whereby the first threshold level of a radio link quality is selected to ensure that a user to be allocated to the first access network will experience a larger utility of communication services than the utility measure for said second access network. FIG. 14 further illustrates another optional act 14-3 as described herein: estimating the utility of occasion services for the first access network and the second access network based on a load level of the respective access network. FIG. 14 also further illustrates another optional act 14-4 as described herein: the utilities of the communication services being proportional to quantities selected from the list of the foregoing paragraph.

However, it should be noted that the favouring of the network giving highest utility is not absolute. If the new user is close to the local area network antenna thereby experiencing a high signal level, an allocation to the local area network may anyway be performed even if the wide area network has the momentarily highest utility.

In the embodiments presented above, the signal strength threshold is used to govern the allocation of new users. However, the load distribution is also affected by the rate of ending communication sessions within the different networks or the handover activity between the networks. If the situation happens to be such that many users in the wide area network disappear either through handover to neighbouring cells or by terminating their calls, the actual access situation may be situated far above a preferred path in e.g. FIG. 2. In such situation, the threshold variation may not be enough in order to return to the path within a reasonable time without risking reaching the capacity limits. A handover between the access networks may be preferred.

Figure 10:
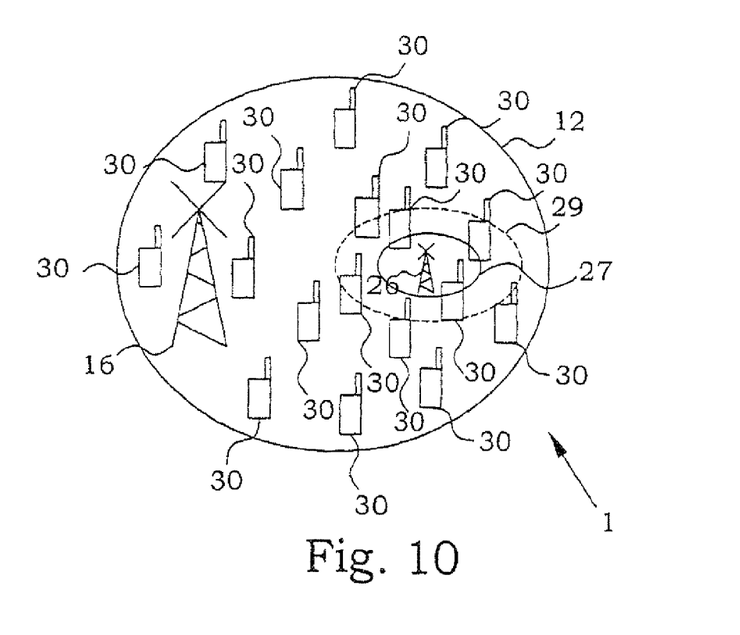
FIG. 10 is a block scheme of a multi-access wireless communications system according to another example embodiment of the technology disclosed herein.
Figure 12:
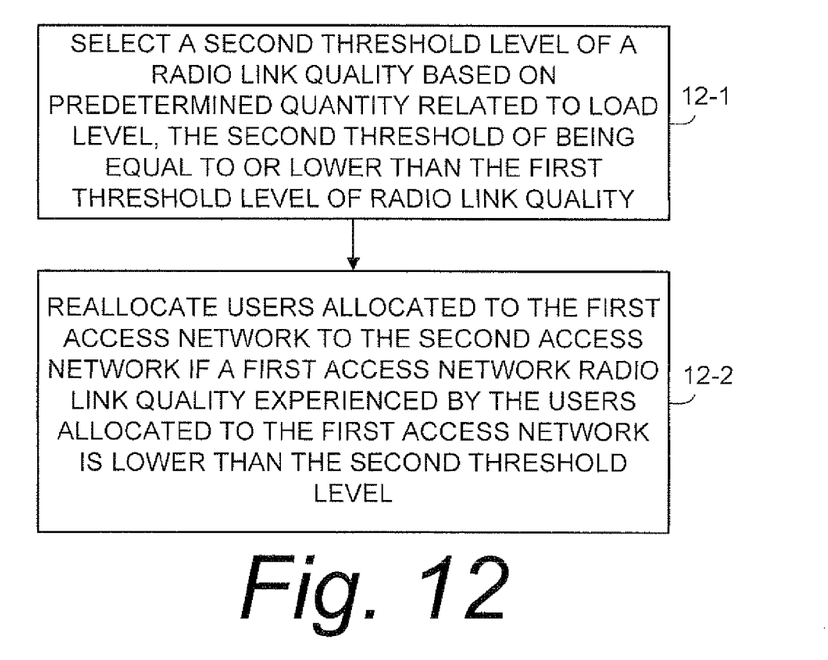
FIG. 12 is a flow diagram of the acts of an example embodiment wherein a second signal strength threshold can be used to determine if an already connected user has to be handed over to the wide area network.

In a particular embodiment of the technology disclosed herein and illustrated in FIG. 12, another signal strength threshold can be used (see act 12-1 in FIG. 12) to determine if an already connected user has to be handed over to the wide area network (see act 12-2 in FIG. 12). This second signal strength threshold is less or equal to the first one. Act 12-1 comprises selecting a second threshold level of a radio link quality based on the determined quantity related to a load level, said second threshold being equal to or lower than the first threshold level of a radio link quality. Act 12-2 comprises reallocating users allocated to the first access network to the second access network if a first access network radio link quality experienced by said users allocated to the first access network is lower than the second threshold level. Typically, the "handover threshold" is kept somewhat lower than the "new access threshold" in order to prevent that users just being connected to the local area network have to change network. In FIG. 10, a multi-access system is illustrated, having a new access threshold giving a certain cell area 27. When a mobile terminal within such an area wants to access the system, an access to the local area network is selected. However, mobile terminals that have made access to the local area network at an earlier stage may be present outside the cell area 27, either by moving the mobile terminal or as a result of an increased "new access threshold". Such mobile terminal is kept having a local area access as long as it is present within a second cell area 29, defined by a "handover threshold". In other words, mobile terminals within area 27 may access the local area network. Mobile terminals present within area 29 but outside area 27 may communicate via the local area access network if already connected. However, new accesses are performed to the wide area access network. Mobile terminal outside area 29 are handed over to the wide area access network.

In the same manner may a mobile terminal, that initially have accessed the wide are system, handover into the local access network if the signal strength is above a "new access threshold" or a "second handover threshold". By not using the same handover threshold in both directions, it is possible to avoid oscillating handovers between the local and wide area access network.

In the embodiments above, systems having one wide area access network

Figure 13:
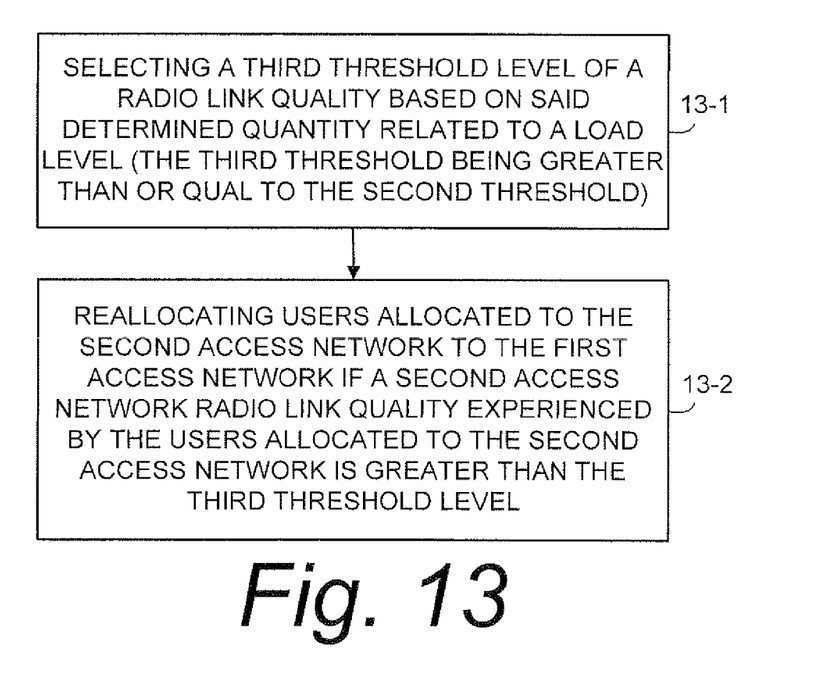
FIG. 13 is a flow diagram of the acts of a method according to another example embodiment.

In another embodiment illustrated in FIG. 13, as act 13-1 a third threshold level of a radio link quality based on said determined quantity related to a load level is selected. The third threshold being is than or equal to the second threshold level of a radio link quality. Act 13-2 comprises reallocating users allocated to the second access network to the first access network if a second access network radio link quality experienced by the users allocated to the second access network is greater than the third threshold level.

In the embodiments above, systems having one wide area access network and one local area access network have been used as examples. However, systems having any arbitrary number of subsystems, local or wide, can be configured according to the ideas of the technology disclosed herein. Non-exclusive examples are: systems having several local area access networks covering different common areas; system having more than two hierarchical levels, e.g. wide area, intermediate area and local area access networks; systems having access networks only partially covering each others areas; and any combination of such systems.

If several possible choices of cells are available, where each cell (except perhaps the widest one) has its own load-dependent threshold, different approaches can be used for selecting in which priority order the cells should be tested. One approach could be to have a fixed pre-determined hierarchic structure. A predetermined first cell is first checked. If the threshold is too high a predetermined second cell is checked, and so on.

Another approach would be to compare the different cells, and e.g. select the cell in which e.g. the present measured signal strength exceeds the present threshold value by the largest amount. A variation of such an approach could be to let the selection order depend on any other parameter, such as experienced utility, bitrate, consumed power etc.

Figure 11:
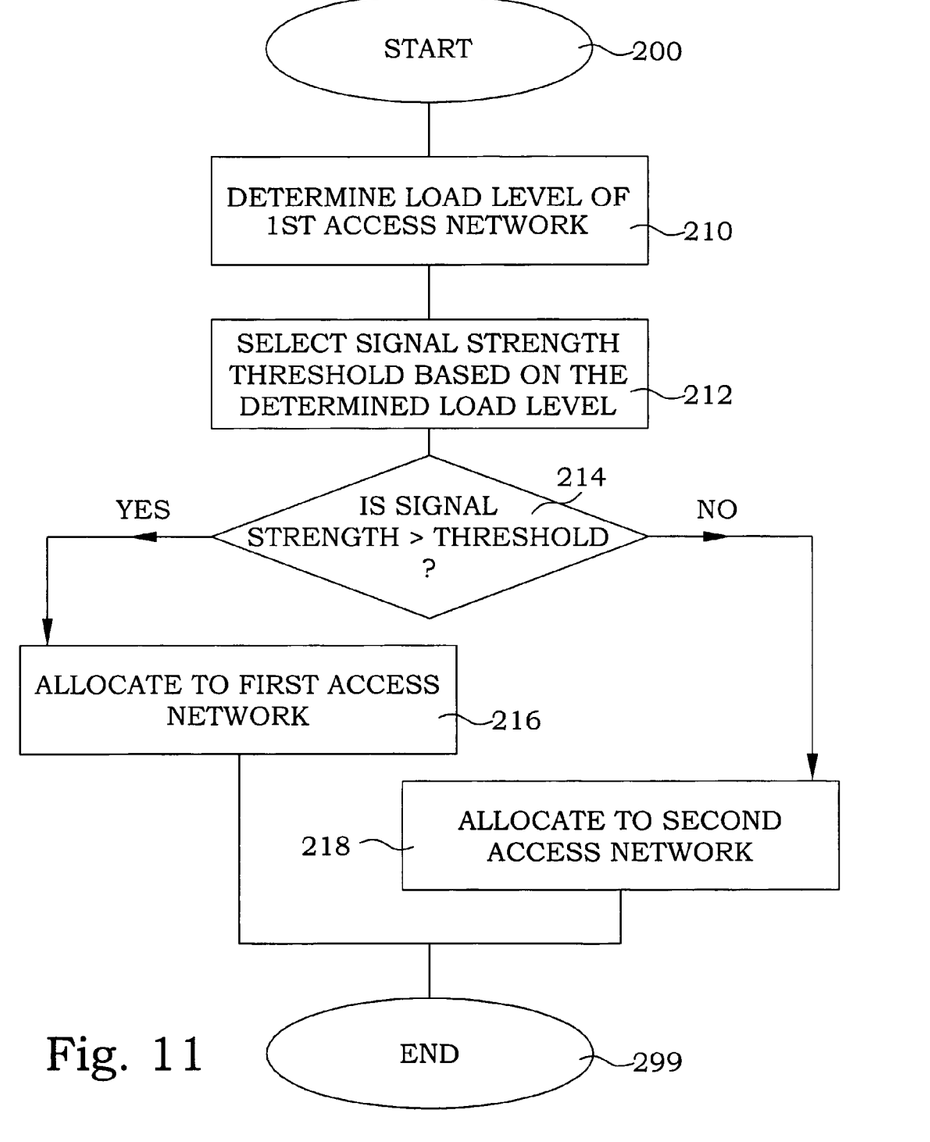
FIG. 11 is a flow diagram of the main acts of a method according to an example embodiment of the technology disclosed herein.

FIG. 11 is a flow diagram of the main steps of an example embodiment of a method according to the technology disclosed herein. The procedure starts in step 200. In step 210, a load level of a first access network is determined. In step 212, a signal strength threshold is selected based on at least the determined load level. In step 214, it is decided if a signal strength from the first access network exceeds the signal strength threshold. If the first access network exceeds the signal strength threshold, the procedure continues to step 216, where the user is allocated to the first access network, typically a local area access network. If the first access network does not exceed the signal strength threshold, the procedure instead continues to step 218, where the user is allocated to the second access network, typically a wide area access network. The procedure is ended in step 299.

Figure 11A:
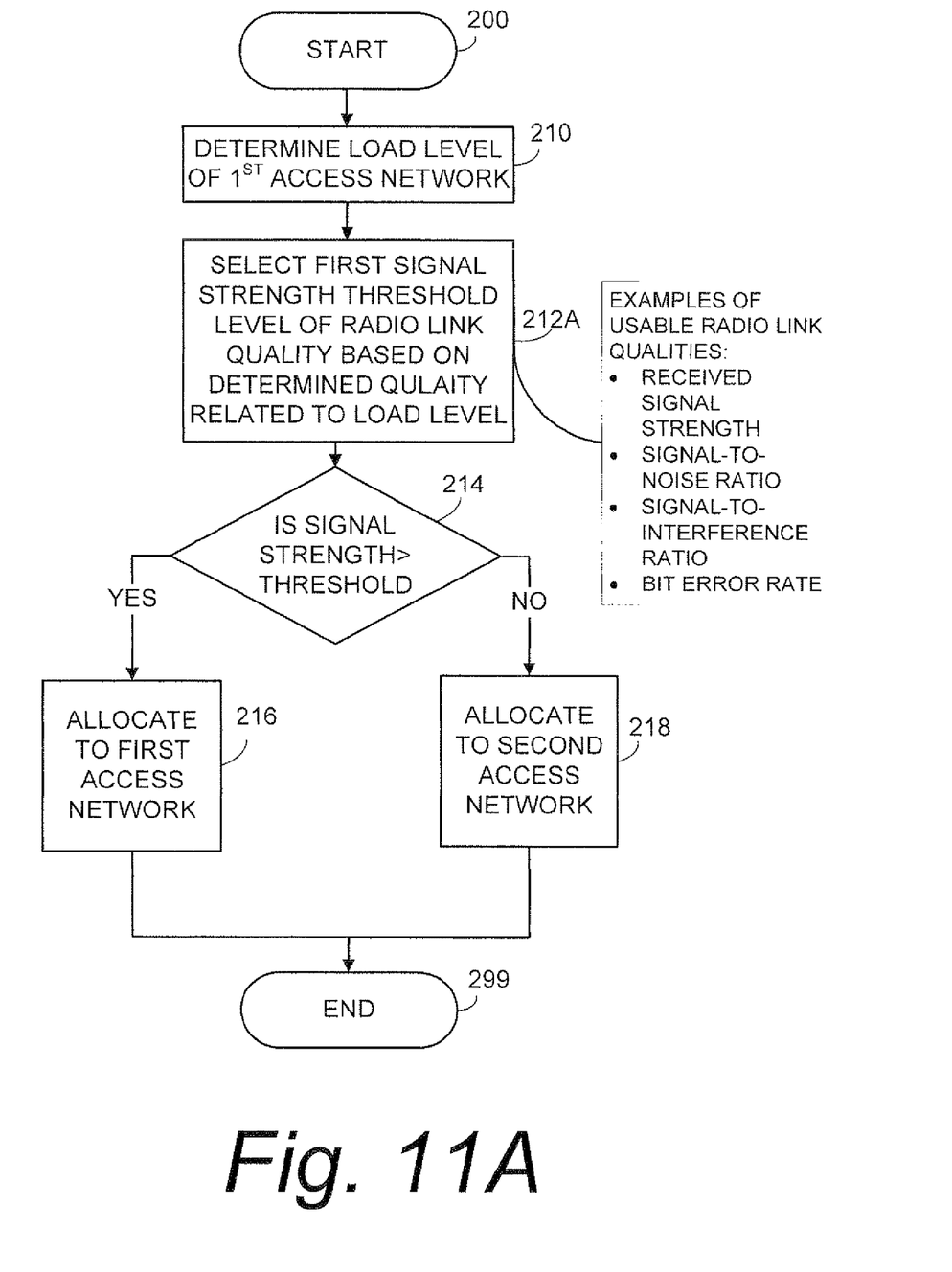
FIG. 11A is a flow diagram of the acts of a method according to another example embodiment of the technology disclosed herein and further showing examples of usable radio link qualities.

In the above exemplifying embodiments, signal strength and signal-to-noise ratio has been used as mobile terminal dependent measures of radio link quality. The technology disclosed herein is operable using any kind of radio link quality and any kind of related radio link quality thresholds. Non-limiting examples of usable radio link qualities are received signal strength intensity, signal-to-noise ratio, signal-to-interference ratio, and bit error ratio. In this regard, FIG. 11A resembles FIG. 11, but shows act 212A as comprising selecting a first signal strength threshold level of a radio link quality based on determined quality related to load level. FIG. 11A further shows that non-limiting examples of usable radio link qualities are received signal strength intensity, signal-to-noise ratio, signal-to-interference ratio, and bit error ratio.

Likewise, the load level has in the above exemplifying embodiments been used as the quantity on which the selection of the radio link quality threshold is made. Such selection could also be made on any quantity related to a load level, for instance remaining capacity or any quantity derivable from the load level.

Figure 11B:
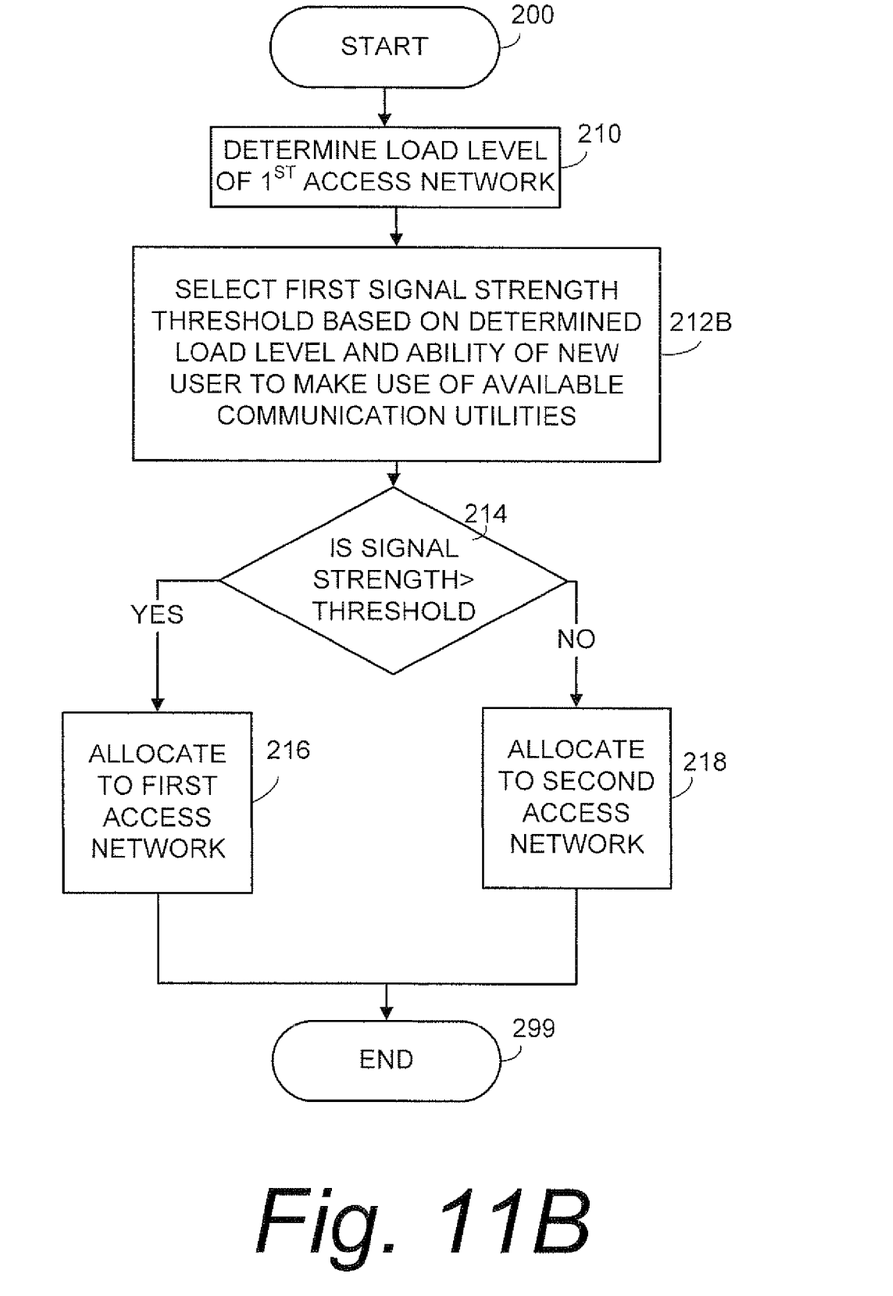
FIG. 11B is a flow diagram of the acts of a method according to another example embodiment of the technology disclosed herein wherein selection of a first signal strength threshold level is dependent, e.g., on ability of a new user to make use of available communication utilities.

FIG. 11B is a flow diagram of the acts of a method according to another example embodiment. FIG. 11B resembles FIG. 11, and differs in that act 212B comprises selecting the first signal strength threshold based on the determined low level and on inability of a new user to make use of available communication utilities, as previously explained herein.

The embodiments described above are to be understood as a few illustrative examples of the technology disclosed herein. It will be understood by those skilled in the art that various modifications, combinations and changes may be made to the embodiments without departing from the scope of the technology disclosed herein. In particular, different part solutions in the different embodiments can be combined in other configurations, where technically possible. The scope of the present invention is, however, defined by the appended claims.

REFERENCES

[1] K. Pahlavan et al., "Handoff in hybrid Mobile Data Networks", in IEEE Personal Communications, pp. 34-47, April 2000.
[2] Kallijokulju, P. Meche, M. J. Rinne, J. Vallström, P. Varshney and S-G. Häggman, "Radio Access Selection for Multistandard Terminals", in IEEE Communications Magazine, pp. 116-124, October 2001.
[3] A. Furuskär, "Radio Resource sharing and Bearer Service Allocation for Multi-Bearer Service, Multi-Access Wireless Networks", PhD thesis, TRITA-S3-RST-0302, ISSN 1400-9137, ISRN KTH/RST/R--03/02--SE.
[4] U.S. Pat. No. 6,163,694.

The invention claimed is:
1. A method for access control in a multi-access communications system having at least two access networks covering at least a common area, the method comprising:
determining a quantity related to a load level in a first access network covering said common area;
selecting a first threshold level of a radio link quality based on said determined quantity related to a load level;
allocating a new user in said common area to said first access network if a first network radio link quality experienced by said new user exceeds said first threshold level; and allocating said new user in said common area to a second access network covering said common area if said first network radio link quality experienced by said new user is lower than said first threshold level.

2. The method according to claim 1, wherein said first threshold level of a radio link quality is increased when said load level approaches a maximum capacity level for guaranteed service quality.

3. The method according to claim 1, further comprising:

providing a utility measure representing a utility of communication services provided to users of said second access network;

associating said quantity related to a load level in said first access network with a utility of communication services provided to users of said first access network, whereby said first threshold level of a radio link quality is selected to ensure that a user to be allocated to said first access network will experience a larger utility of communication services than said utility measure for said second access network.

4. The method according to claim 3, wherein said utilities of communication services are constant as long as a respective load level in said first and said second access networks is less than a respective maximum capacity level for guaranteed quality.

5. The method according to claim 3, wherein said utilities of communication services are estimated based on a load level of respective access networks.

6. The method according to claim 5, wherein said utilities of communication services are proportional to a quantity selected from the list of:

$(1-L)$;
$\log_2(1-L)$;
step function$(L)$; and
$1/[c+1/(1-L)]$
where $L$ is a normalised load level and $c$ is a constant.

7. Method according to claim 3, wherein said selection of said first signal strength threshold level is further dependent on an ability of said new user to make use of available communication utilities.

8. The method according to claim 1, further comprising:

selecting a second threshold level of a radio link quality based on said determined quantity related to a load level, said second threshold being equal to or lower than said first threshold level of a radio link quality;

reallocating users allocated to said first access network to said second access network if a first access network radio link quality experienced by said users allocated to said first access network is lower than said second threshold level.

9. The method according to claim 8, further comprising:

selecting a third threshold level of a radio link quality based on said determined quantity related to a load level, said third threshold being greater than or equal to said second threshold level of a radio link quality;

reallocating users allocated to said second access network to said first access network if a second access network radio link quality experienced by said users allocated to said second access network is greater than said third threshold level.

10. The method according to claim 1, wherein said radio link quality is selected from the list of:

received signal strength intensity;
signal-to-noise ratio;
signal-to-interference ratio; and
bit error ratio.

* * * * *